(12) United States Patent
Goenka et al.

(10) Patent No.: US 11,863,233 B2
(45) Date of Patent: Jan. 2, 2024

(54) SELECTIVE RESET SYSTEM FOR A REMOTE PHYSICAL DEVICE

(71) Applicant: ARRIS Enterprises LLC, Suwanee, GA (US)

(72) Inventors: Anand Kumar Goenka, Karnataka (IN); Vasudevan Jothilingam, Karnataka (IN); Wei Hung Hui, Sharon, MA (US)

(73) Assignee: ARRIS Enterprises LLC, Suwanee, GA (US)

( * ) Notice: Subject to any disclaimer, the term of this patent is extended or adjusted under 35 U.S.C. 154(b) by 209 days.

(21) Appl. No.: 17/338,121

(22) Filed: Jun. 3, 2021

(65) Prior Publication Data

US 2021/0384974 A1 Dec. 9, 2021

Related U.S. Application Data

(60) Provisional application No. 63/056,338, filed on Jul. 24, 2020.

(30) Foreign Application Priority Data

Jun. 5, 2020 (IN) .............................. 202031023745

(51) Int. Cl.
*H04B 10/2575* (2013.01)
*H04L 12/28* (2006.01)
*G06F 8/61* (2018.01)

(52) U.S. Cl.
CPC ......... *H04B 10/25751* (2013.01); *G06F 8/63* (2013.01); *H04L 12/2801* (2013.01)

(58) Field of Classification Search
CPC ....... G06F 8/63; G06F 9/445; H04L 12/2801; H04N 21/61; H04N 21/443; H04N 21/6338
See application file for complete search history.

(56) References Cited

U.S. PATENT DOCUMENTS 6,804,774 B1 * 10/2004 Larvoire ................... G06F 8/63
717/174
7,814,481 B1 10/2010 Welder et al.
(Continued)

FOREIGN PATENT DOCUMENTS

| CN | 105786547 A | * | 7/2016 | ............. G06F 9/445 |
| CN | 109413497 A | * | 3/2019 | ........... G06F 9/4406 |
| CN | 107659784 B | * | 5/2019 | ............. H04N 19/42 |

OTHER PUBLICATIONS

Ibanez et al., "Event-Driven Packet Processing", Nov. 2019, ACM (Year: 2019).*

(Continued)

*Primary Examiner* — Wei Y Zhen
*Assistant Examiner* — Junchun Wu
(74) *Attorney, Agent, or Firm* — Chernoff, Vilhauer, McClung & Stenzel, LLP (57) ABSTRACT

A cable distribution system that includes a head end connected to a plurality of customer devices through a transmission network that includes a remote fiber node that converts digital data to analog data suitable for the plurality of customer devices. The remote fiber node includes a processor. The remote fiber node receives a software image containing (i) a hardware image, (ii) a primary boot loader, (iii) a kernel, (iv) a software dataplane for a dataplane, and (v) software applications for a control plane. Based upon the file name of the software image selectively using at least some of (i) a hardware image, (ii) a primary boot loader, (iii) a kernel, (iv) a software dataplane for a dataplane, and (v) software applications for a control plane, in resetting the remote physical device.

7 Claims, 10 Drawing Sheets

(56) References Cited

U.S. PATENT DOCUMENTS

| | | | | |
|---|---|---|---|---|
| 8,914,785 | B2* | 12/2014 | Buswell | G06F 9/45558 |
| | | | | 717/173 |
| 9,692,612 | B2* | 6/2017 | Rakib | H04N 21/2383 |
| 9,715,380 | B2* | 7/2017 | Ramachandran | H04L 67/34 |
| 10,623,814 | B1* | 4/2020 | Bonen | H04N 21/4432 |
| 10,742,553 | B1* | 8/2020 | Thomas | H04L 45/745 |
| 10,997,297 | B1* | 5/2021 | Lin | H04L 9/30 |
| 11,657,125 | B2* | 5/2023 | Ozawa | G06F 9/4881 |
| | | | | 726/2 |
| 2004/0006689 | A1 | 1/2004 | Miller et al. | |
| 2007/0038685 | A1 | 2/2007 | Chan et al. | |
| 2015/0040115 | A1* | 2/2015 | Capper | G06F 8/63 |
| | | | | 717/171 |
| 2018/0088963 | A1* | 3/2018 | Arora | G06F 9/4406 |
| 2018/0248770 | A1* | 8/2018 | Regmi | G06F 9/45533 |
| 2019/0036785 | A1* | 1/2019 | Pfeffer | H04L 47/783 |
| 2019/0324761 | A1* | 10/2019 | Choi | G06F 9/4405 |
| 2020/0153682 | A1* | 5/2020 | Nidumolu | G06F 9/4416 |
| 2020/0186622 | A1* | 6/2020 | Kim | H04L 67/12 |
| 2020/0348944 | A1* | 11/2020 | Ish-Am | G06F 13/4282 |
| 2021/0384974 | A1* | 12/2021 | Goenka | H04N 21/6338 |

OTHER PUBLICATIONS

Wang et al., "RESET Mechanism of TiOx Resistance-Change Memory Device", Jul. 2009, IEEE, vol. 30, No. 7 (Year: 2009).*

Shaghaghi et al., "Software-Defined Network (SDN) Data Plane Security: Issues, Solutions, and Future Directions", Jan. 2020, Springer Nature Switzerland (Year: 2020).*

Thimmaraju et al., "Taking Control of SDN-based Cloud Systems via the Data Plane", Mar. 2018, ACM (Year: 2018).*

International Search Report and Written Opinion Re: Application No. PCT/US2021/0035681 (dated Aug. 31, 2021).

* cited by examiner

SELECTIVE RESET SYSTEM FOR A REMOTE PHYSICAL DEVICE

CROSS REFERENCE TO RELATED APPLICATIONS

This application claims priority of Indian Patent Application Serial Number 202031023745 filed Jun. 5, 2020; and this application claims the benefit of U.S. Provisional Patent Application No. 63/056,338 filed Jul. 24, 2020.

BACKGROUND

The subject matter of this application relates to efficient remote-phy dataplane management for a cable system.

Cable Television (CATV) services provide content to large groups of customers (e.g., subscribers) from a central delivery unit, generally referred to as a "head end," which distributes channels of content to its customers from this central delivery unit through an access network comprising a hybrid fiber coax (HFC) cable plant, including associated components (nodes, amplifiers and taps). Modern Cable Television (CATV) service networks, however, not only provide media content such as television channels and music channels to a customer, but also provide a host of digital communication services such as Internet Service, Video-on-Demand, telephone service such as VoIP, home automation/security, and so forth. These digital communication services, in turn, require not only communication in a downstream direction from the head end, through the HFC, typically forming a branch network and to a customer, but also require communication in an upstream direction from a customer to the head end typically through the HFC network.

To this end, CATV head ends have historically included a separate Cable Modem Termination System (CMTS), used to provide high speed data services, such as cable Internet, Voice over Internet Protocol, etc. to cable customers and a video headend system, used to provide video services, such as broadcast video and video on demand (VOD). Typically, a CMTS will include both Ethernet interfaces (or other more traditional high-speed data interfaces) as well as radio frequency (RF) interfaces so that traffic coming from the Internet can be routed (or bridged) through the Ethernet interface, through the CMTS, and then onto the RF interfaces that are connected to the cable company's hybrid fiber coax (HFC) system. Downstream traffic is delivered from the CMTS to a cable modem and/or set top box in a customer's home, while upstream traffic is delivered from a cable modem and/or set top box in a customer's home to the CMTS. The Video Headend System similarly provides video to either a set-top, TV with a video decryption card, or other device capable of demodulating and decrypting the incoming encrypted video services. Many modern CATV systems have combined the functionality of the CMTS with the video delivery system (e.g., EdgeQAM—quadrature amplitude modulation) in a single platform generally referred to an Integrated CMTS (e.g., Integrated Converged Cable Access Platform (CCAP))—video services are prepared and provided to the I-CCAP which then QAM modulates the video onto the appropriate frequencies. Still other modern CATV systems generally referred to as distributed CMTS (e.g., distributed Converged Cable Access Platform) may include a Remote PHY (or R-PHY) which relocates the physical layer (PHY) of a traditional Integrated CCAP by pushing it to the network's fiber nodes (R-MAC PHY relocates both the MAC and the PHY to the network's nodes). Thus, while the core in the CCAP performs the higher layer processing, the R-PHY device in the remote node converts the downstream data sent from the core from digital-to-analog to be transmitted on radio frequency to the cable modems and/or set top boxes, and converts the upstream radio frequency data sent from the cable modems and/or set top boxes from analog-to-digital format to be transmitted optically to the core.

BRIEF DESCRIPTION OF THE DRAWINGS

For a better understanding of the invention, and to show how the same may be carried into effect, reference will now be made, by way of example, to the accompanying drawings, in which.

DETAILED DESCRIPTION

Figure 1:
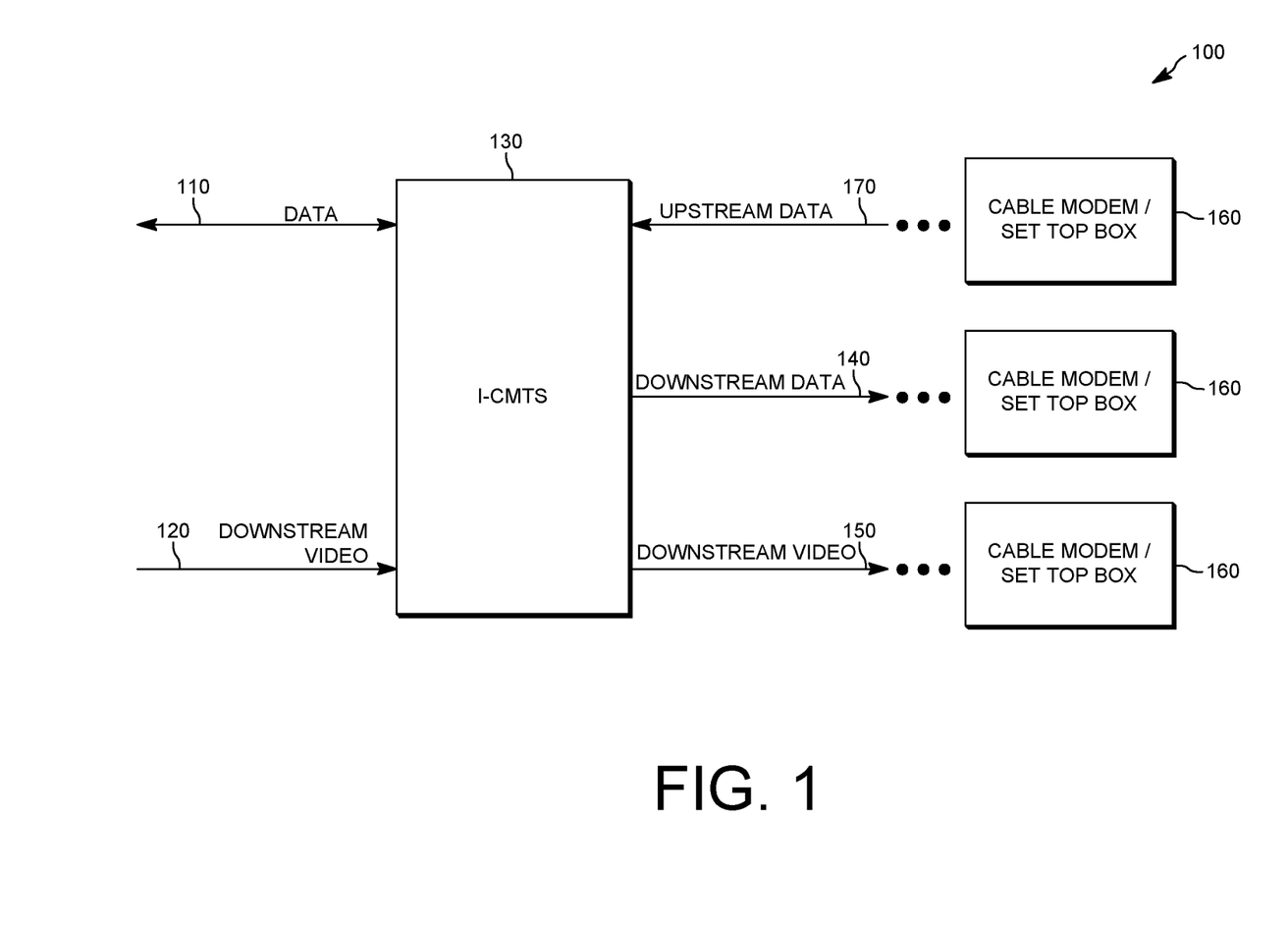
FIG. 1 illustrates an integrated Cable Modem Termination System.

Referring to FIG. 1, an integrated CMTS (e.g., Integrated Converged Cable Access Platform (CCAP)) 100 may include data 110 that is sent and received over the Internet (or other network) typically in the form of packetized data. The integrated CMTS 100 may also receive downstream video 120, typically in the form of packetized data from an operator video aggregation system. By way of example, broadcast video is typically obtained from a satellite delivery system and pre-processed for delivery to the subscriber though the CCAP or video headend system. The integrated CMTS 100 receives and processes the received data 110 and downstream video 120. The CMTS 130 may transmit downstream data 140 and downstream video 150 to a customer's cable modem and/or set top box 160 through a RF distribution network, which may include other devices, such as amplifiers and splitters. The CMTS 130 may receive upstream data 170 from a customer's cable modem and/or set top box 160 through a network, which may include other devices, such as amplifiers and splitters. The CMTS 130 may include multiple devices to achieve its desired capabilities.

Figure 2:
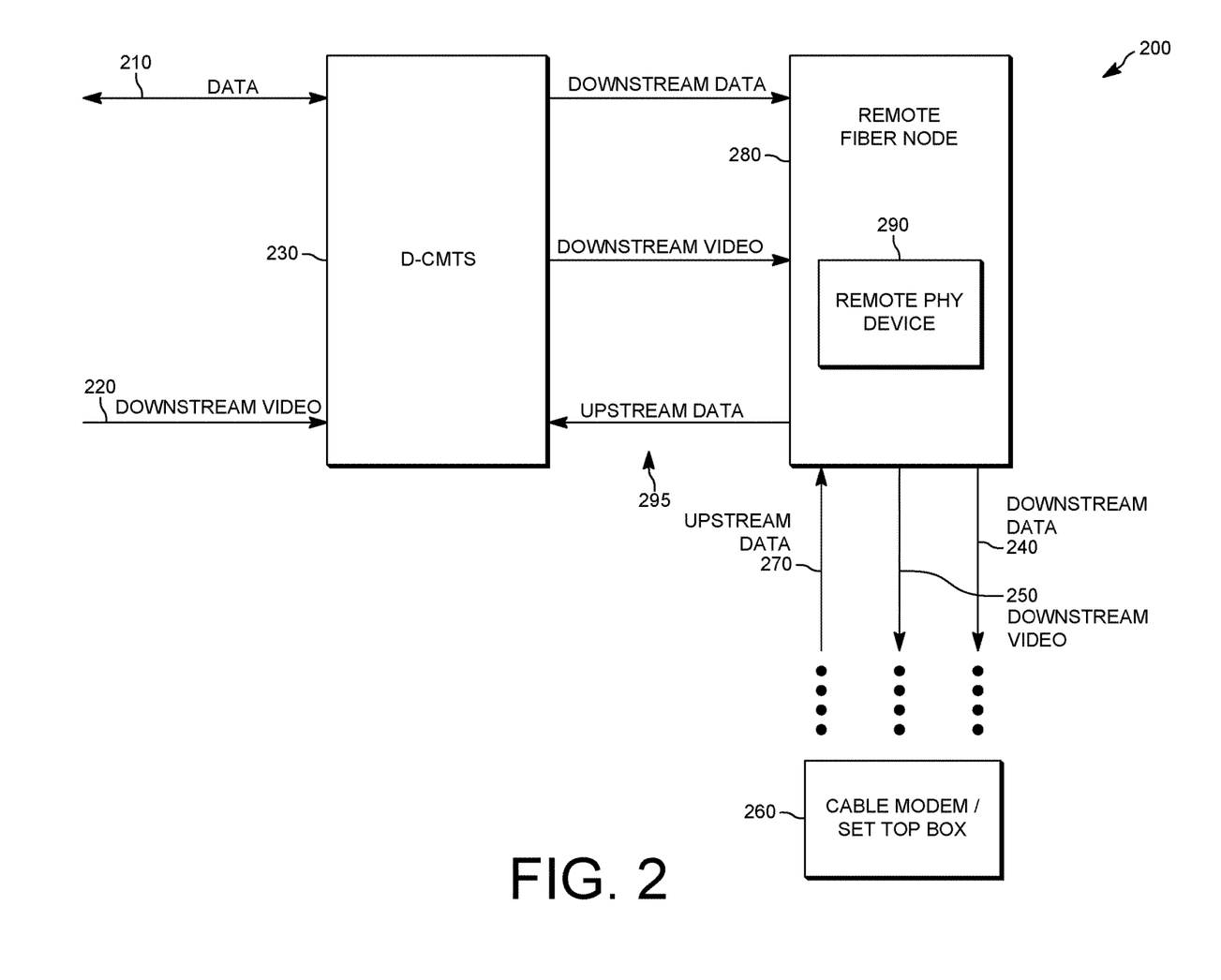
FIG. 2 illustrates a distributed Cable Modem Termination System.

Referring to FIG. 2, as a result of increasing bandwidth demands, limited facility space for integrated CMTSs, and power consumption considerations, it is desirable to include a Distributed Cable Modem Termination System (D-CMTS) 200 (e.g., Distributed Converged Cable Access Platform (CCAP)). In general, the CMTS is focused on data services while the CCAP further includes broadcast video services. The D-CMTS 200 distributes a portion of the functionality of the I-CMTS 100 downstream to a remote location, such as a fiber node, using network packetized data. An exemplary D-CMTS 200 may include a remote PHY architecture, where a remote PHY (R-PHY) is preferably an optical node device that is located at the junction of the fiber and the coaxial. In general, the R-PHY often includes the MAC and/or PHY layers of a portion of the system. The D-CMTS 200 may include a D-CMTS 230 (e.g., core) that includes data 210 that is sent and received over the Internet (or other network) typically in the form of packetized data. The D-CMTS 230 may also receive downstream video 220, typically in the form of packetized data from an operator video aggregation system. The D-CMTS 230 receives and processes the received data 210 and downstream video 220. A remote fiber node 280 preferably include a remote PHY device 290. The remote PHY device 290 may transmit downstream data 240 and downstream video 250 to a customer's cable modem and/or set top box 260 through a network, which may include other devices, such as amplifier and splitters. The remote PHY device 290 may receive upstream data 270 from a customer's cable modem and/or set top box 260 through a network, which may include other devices, such as amplifiers and splitters. The remote PHY device 290 may include multiple devices to achieve its desired capabilities. The remote PHY device 290 primarily includes PHY related circuitry, such as downstream QAM modulators, upstream QAM demodulators, together with pseudowire logic to connect to the D-CMTS 230 using network packetized data. The remote PHY device 290 and the D-CMTS 230 may include data and/or video interconnections, such as downstream data, downstream video, and upstream data 295. It is noted that, in some embodiments, video traffic may go directly to the remote physical device thereby bypassing the D-CMTS 230.

By way of example, the remote PHY device 290 may covert downstream DOCSIS (i.e., Data Over Cable Service Interface Specification) data (e.g., DOCSIS 1.0; 1.1; 2.0; 3.0; 3.1; and 4.0 each of which are incorporated herein by reference in their entirety), video data, out of band signals received from the D-CMTS 230 to analog for transmission over RF or analog optics. By way of example, the remote PHY device 290 may convert upstream DOCSIS, and out of band signals received from an analog medium, such as RF or analog optics, to digital for transmission to the D-CMTS 230. As it may be observed, depending on the particular configuration, the R-PHY may move all or a portion of the DOCSIS MAC and/or PHY layers down to the fiber node.

Figure 3:
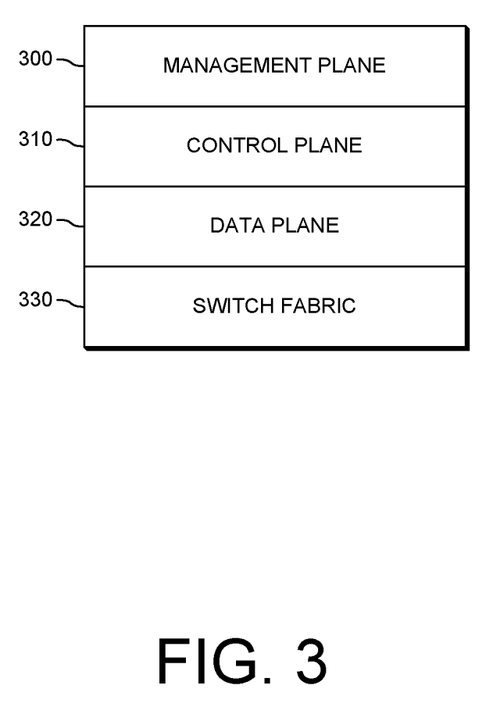
FIG. 3 illustrates a layered network processing stack.

Referring to FIG. 3, for data processing and for transferring data across a network, the architecture of the hardware and/or software may be configured in the form of a plurality of different planes, each of which performing a different set of functionality. In relevant part the layered architecture may include different planes such as a management plane 300, a control plane 310, and a data plane 320. A switch fabric 330 may be included as part of the layered architecture.

For example, the management plane 300 may be generally considered as the customer interaction or otherwise the general software application being run. The management plane typically configures, monitors, and provides management, monitoring, and configuration served to all layers of the network stack and other portions of the system.

For example, the control plane 310 is a component to a switching function that often includes system configuration, management, and exchange of routing table information and forwarding information. Typically, the exchange of routing table information is performed relatively infrequently. A route controller of the control plane 310 exchanges topology information with other switches and constructs a routing table based upon a routing protocol. The control plane may also create a forwarding table for a forwarding engine. In general, the control plane may be thought of as the layer that makes decisions about where traffic is sent. Since the control functions are not performed on each arriving individual packet, they tend not to have a strict speed constraint.

For example, the data plane 320 parses packet headers for switching, manages quality of service, filtering, medium access control, encapsulations, and/or queuing. As a general matter, the data plane carriers the data traffic, which may be substantial in the case of cable distribution networks. In general, the data plane may be thought of as the layer that primarily forwards traffic to the next hop along the path to the selected destination according to the control plane logic through the switch fabric. The data plane tends to have strict speed constraints since it is performing functions on each arriving individual packet.

The remote physical device 290 needs to support updating the software of the remote physical device. For example, the D-CMTS 230 may command the remote physical device 290 to reset via a ResetCtrl GCP TLV, such as using a command line interface. For example, the remote physical device 290 may initiate a reset on its own in reaction to some internal or external event.

Figure 4:
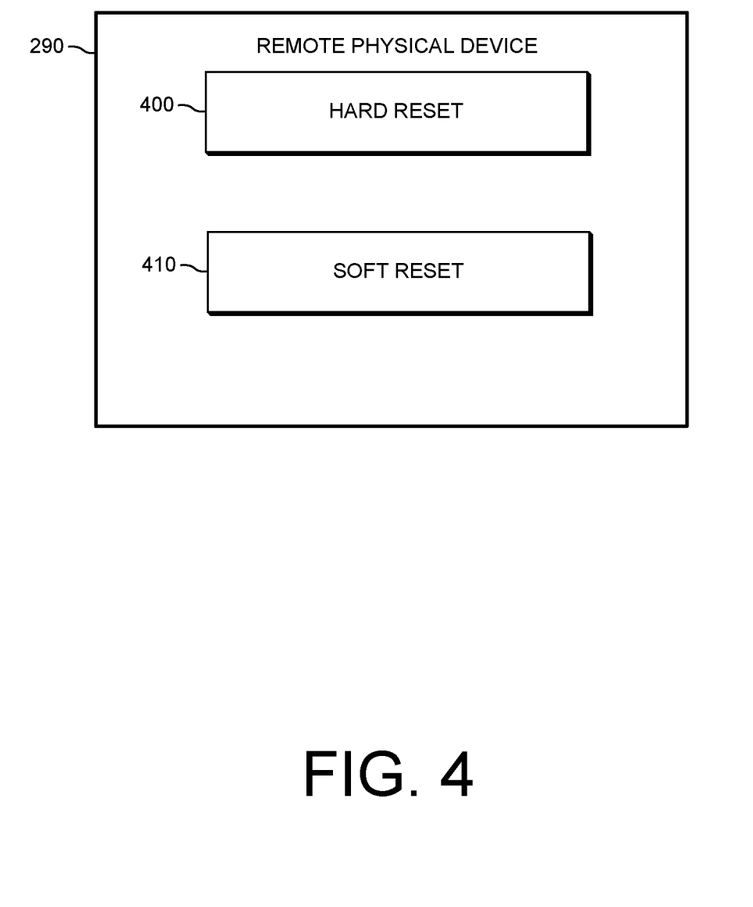
FIG. 4 illustrates types of resets supported by a remote physical device.

Referring to FIG. 4, the remote physical device 290 may include a hard reset 400 which is the most comprehensive form of reset. The hard reset 400 may be thought of as a "reboot" of the device. When the remote physical device 290 performs a hard reset 400, the remote physical device 290 performs a power cycle, or the equivalent thereof, whereupon the remote physical device 290 returns to a state similar to the state achieved on initial power up. The remote physical device 290 retains non-volatile configuration through the hard reset. After the hard reset 400, the remote physical device 290 returns to the beginning of the remote physical device 290 initialization state machine and performs initialization.

The remote physical device 290 may include a soft reset 410 that provides a partial reset of the remote physical device 290. After a soft reset 410, the remote physical device 290 takes steps to hasten the remote physical device 290 initialization process and minimize service interruption. The soft reset 410 resets the remote physical device 290 volatile configuration and operating state, including terminating all connections to all D-CMTSs, releasing IP addresses obtained via DHCP, clearing network authentication information, etc. The remote physical device 290 may reset all software states except that which is needed to maintain IEEE 1588 clock frequency.

The soft reset 410 achieves quicker remote physical device 290 initialization by maintaining the current IEEE 1588 clock frequency without adjustment throughout the soft reset 410 process until it restarts the sync process with the grand master clock (GMC). This allows the remote physical device 290 to provide synchronized operation without having to engage in the time consuming full PTP sync process with the GMC.

Figure 5:
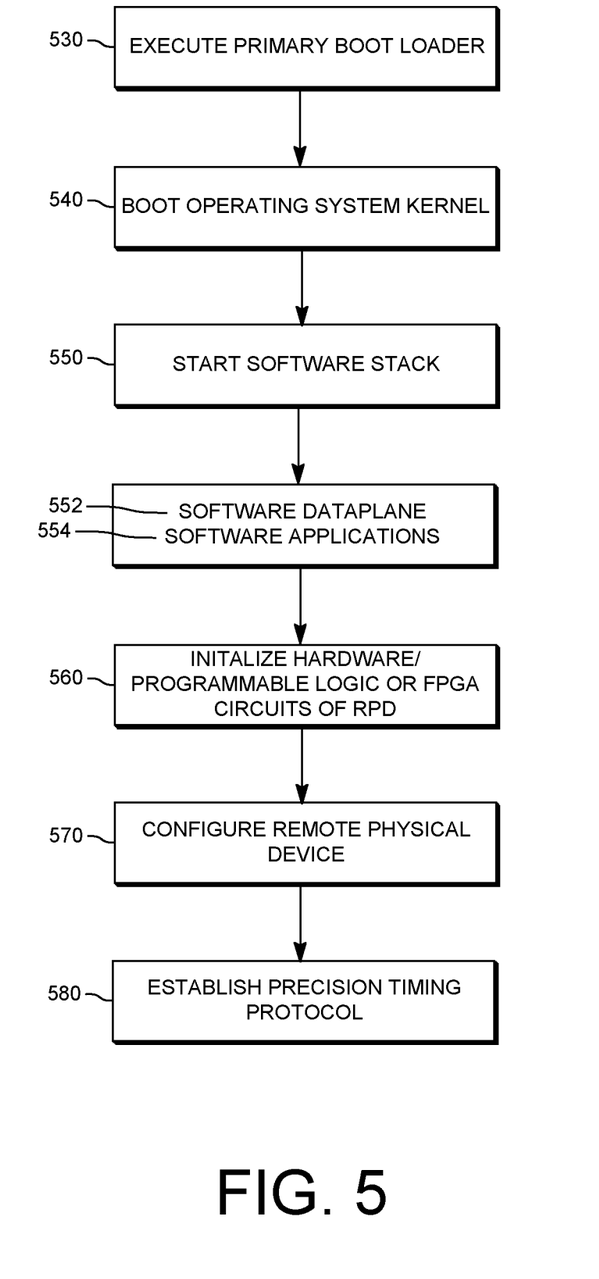
FIG. 5 illustrates a hard reset process for a remote physical device.

Referring to FIG. 5, the hard reset 400 undergoes a time-consuming process that generally requires 4-5 minutes during which service for the customer is not provided by the remote physical device 290. The hard reset 400 process tends to vary from remote physical device to remote physical device, but in general, the D-CMTS 230 downloads an image file (.ITB) that includes a FPGA image, a Uboot (Boot.bin), a Linux Kernel, and all applications and software dataplane. The remote physical device 290 then executes the primary boot loader 530 that includes instructions to boot the remote physical device's 290 operating system kernel.

The operating system kernel 540 is booted and then the software stack is started 550. The software stack 550 includes a software dataplane 552 and a plurality of software applications 554. After starting the software stack 550, the remote physical device 290 initializes the hardware 560 (e.g., initialize hardware/programmable logic or FPGA circuits of RPD). After the hardware initializes 560, the remote physical device 290 connects with the D-CMTS 230 to be configured 570 and precision timing protocol 580 is established.

Figure 6:
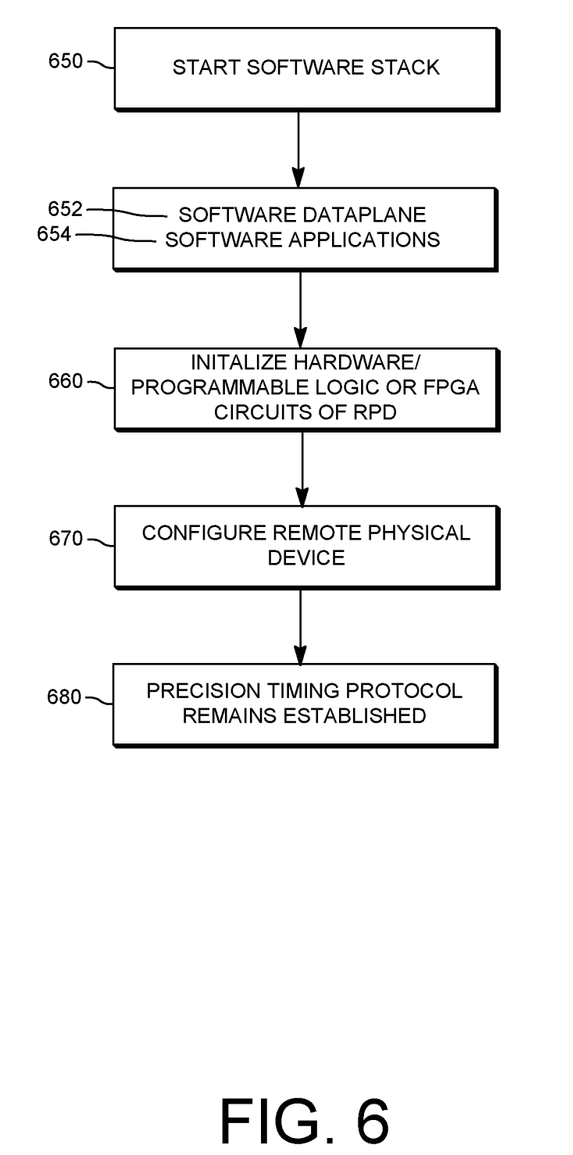
FIG. 6 illustrates a soft reset process for a remote physical device.

Referring to FIG. 6, the soft reset 410 omits downloading the imagefile (.ITB), omits resetting remote physical device, omits loading the entire image file (.ITB), omits executing the primary boot loader, and omits booting operating system kernel. The soft reset 410 undergoes a somewhat time-consuming process that requires generally 60 seconds where service for the customer is not provided by the remote physical device 290. The soft reset 410 may include starting the software stack 650 which includes a software dataplane 652 and a plurality of software applications 654. After starting the software stack 650, the remote physical device 290 initializes the hardware 660 (e.g., initialize hardware/programmable logic or FPGA circuits of RPD). After the hardware initializes 660, the remote physical device 290 connects with the D-CMTS 230 to be configured 670 and precision timing protocol 680 remains established.

In the case of either the hard reset or the soft reset, the video service, data service, out-of-band data service, etc. are impacted because the reset process kills all applications including the software dataplane. During the reset process the remote physical device 290 re-establishes the GCP ("generic control plane" is a protocol used for configuration of the remote physical device) and the L2TP (layer two tunnelling protocol) connections from scratch. Also, during the reset process of the remote physical device 290, the software dataplane is restarted and reprogrammed. Further, the FPGA dataplane modulator is reprogrammed.

When the remote physical device 290 is restarted, either as a result of a hard reset or a soft reset, the processing of video content, data service, and out-of-band data does not restart until after the configuration is processed and the precision timing protocol is established or maintained. Unfortunately, for a hard reset this process typically takes 4-5 minutes to complete. In most cases, resetting the remote physical device, executing the primary boot loader, downloading of the image file (.ITB) file, and booting operating system kernel is not necessary because those portions of the remote physical device 290 remain operational. In most cases, if updating is required only the software stack 650 which includes the software dataplane 652 and the plurality of software applications 654 is modified. After modification of the software stack 650, the remote physical device 290 initializes the hardware 660 and connects with the D-CMTS 230 to be configured 670 and establish the precision timing protocol 680.

Unfortunately, the hard reset process typically requires over 4-5 minutes to complete and the soft reset process typically requires over a minute to complete, during which time services for customers are not available. A modified process is desirable to reduce the impact on the currently active services both from the perspective of the remote physical device and the perspective of the D-CMTS. To achieve a reduction in the unavailability of active services during the reset process, the remote physical device should maintain configurations received from the D-CMTS, maintain L2TP connection, and/or session state across the reset process so that the remote physical device does not need to establish a fresh GCP connection and L2TP connection with the D-CMTS. For example, the configuration state may include QAM channel parameters, OFDM channel parameters, and OOB channel parameters. In this manner, the remote physical device maintains the details of the D-CMTS core connection across the reset process. With the remote physical device maintaining the details of the D-CMTS core connection, the D-CMTS is alleviated of the need to resend all of such configuration information during the reset process.

Figure 7:
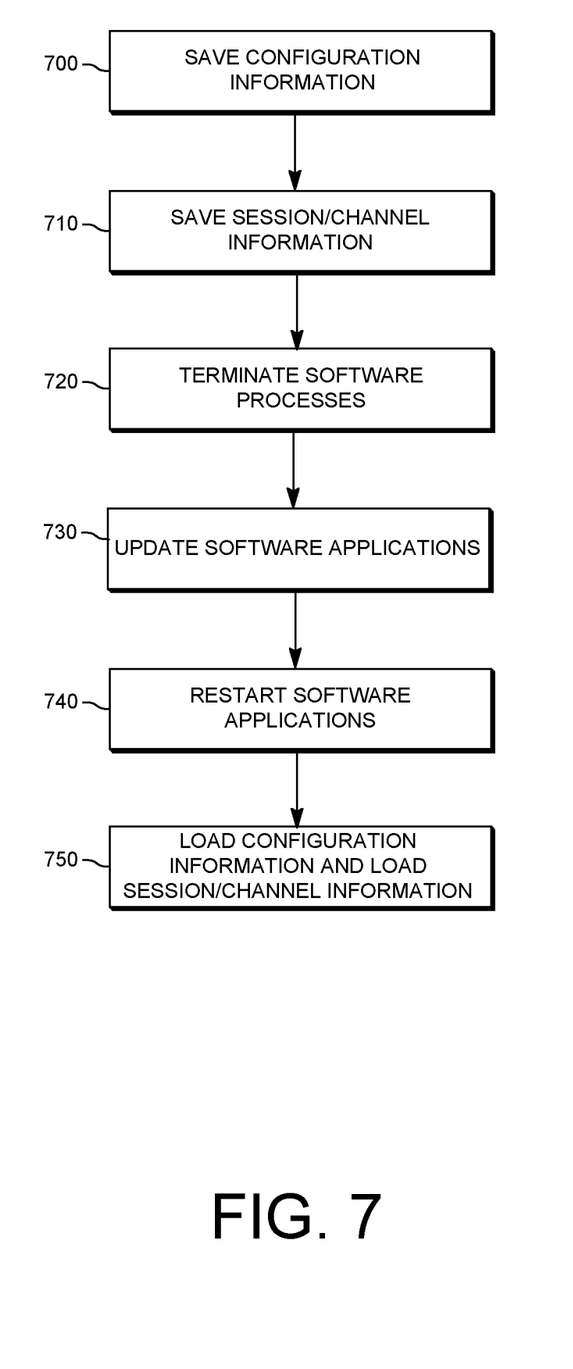
FIG. 7 illustrates a modified reset process for a remote physical device.

Referring to FIG. 7, the remote physical device 290 preferably saves its configuration information 700 (e.g., global configuration of RPD) and saves its session/channel information 710. By saving the configuration information 700 and the session/channel information 710, after the reset process the remote physical device may load this information locally, rather than the traditional process of obtaining such information from the D-CMTS. In this manner, the D-CMTS may remain the substantially the same with respect to the configuration information and the session/channel information. After saving the configuration information 700 and the session/channel information 710 the software processes are terminated 720. The software applications are modified, if desired, with updated software applications 730. The software applications are restarted 740 and the configuration information and the session/channel information is loaded 750. This modified resetting process is especially appropriate if the hardware is functioning properly and it is desirable to restart the software or otherwise it is desirable to update the software which is then started.

Figure 8:
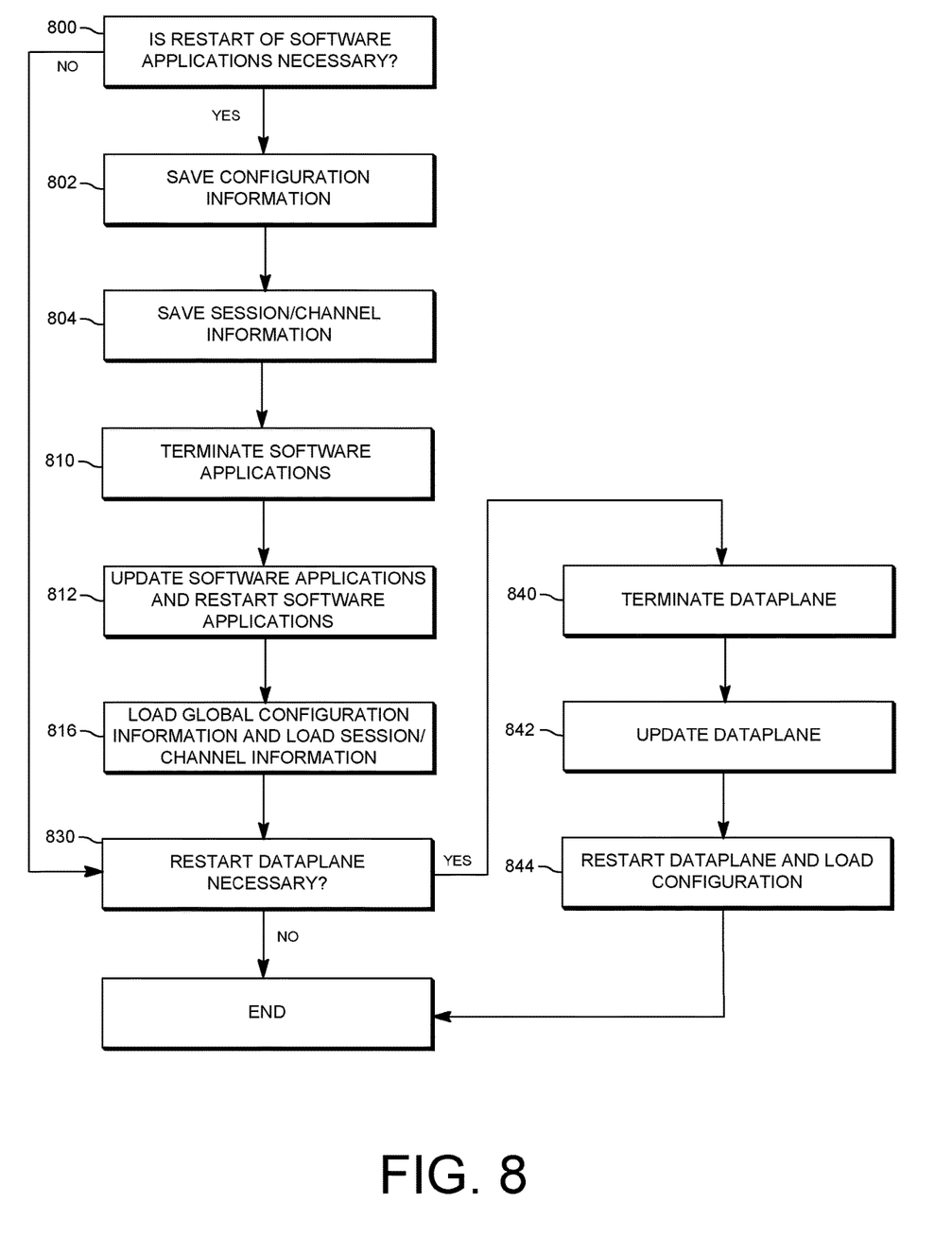
FIG. 8 illustrates a further modified reset process for a remote physical device.

Referring to FIG. 8, to further decrease the impact on services it was determined that if there is an error in the dataplane, then the software dataplane should be updated (if necessary) and restarted in an effective manner. If there is an error in the software applications, then the software applications should be updated (if necessary) and restarted in an effective manner.

The reset process may first determine whether restarting the software applications is necessary 800. If remote physical device 290 determines the software applications should be restarted, then its configuration information 802 is saved and its session/channel information 804 is saved. By saving the configuration information 800 and the session/channel information 810, after the reset process the remote physical device may load this information locally, rather than the traditional process of obtaining such information from the D-CMTS. In this manner, the D-CMTS may remain the substantially the same with respect to the configuration information and the session/channel information. After saving the configuration information 802 and the session/channel information 804 the software applications are terminated 810. The software applications are modified, if desired, with updated software applications and the software applications are restarted 812. The software applications are loaded with the configuration information and the session/channel information 816. The services are not impacted as a result of restarting the software applications.

The reset process may next determine whether restarting the software dataplane is necessary 830. If remote physical device 290 determines the software dataplane should be restarted, then the software dataplane is terminated 840. The software dataplane is modified, if desired, with updated software dataplane 842. The software dataplane is restarted and the configuration is loaded 844.

The GCP connection between a remote physical device and the D-CMTS core may fail for various reasons. In this case of connection failure, a re-establishment of the GCP connection is preferably made without going through the full remote physical device initialization process. The GCP reconnect process is initiated by the remote physical device. The remote physical device maintains a GCP configuration attribute that controls the remote physical device actions on a GCP connection failure, including whether or not it should attempt to reconnect to a particular core in the event of a GCP connection failure. Each core connected to the remote physical device is responsible for configuring the remote physical device on whether or not to attempt a reconnect to that particular core upon GCP connection failure. The configuration is accomplished via the GCP Connection Recovery Action (GcpRecoveryAction) TLV.

The soft reset process, the hard reset process, and/or the modified reset processes may be initiated in any suitable manner. For example, initiation may be through a command line interface, a command from the D-CMTS, and/or the remote physical device in the event of a failure such as a software crash, a watchdog timeout, a software upgrade, etc.

Figure 9:
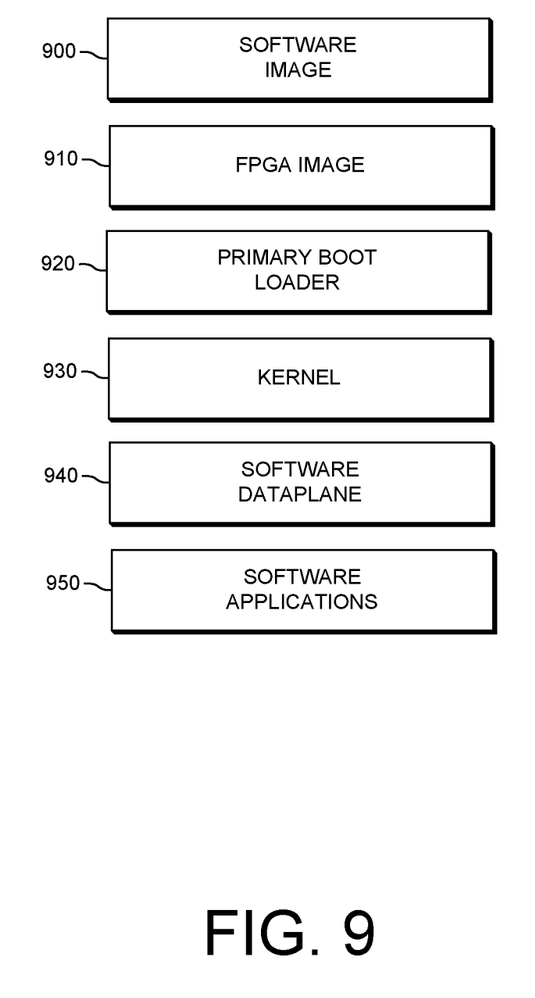
FIG. 9 illustrates a software image and components thereof.

Referring to FIG. 9, as previously described a software image 900 that is downloaded to the remote physical device 290 includes multiple different portions therein. The software image 900 may be in the form of an image tree blob (.ITB) file format. The software image 900 may include a FPGA image 910, a primary boot loader 920 (e.g., Uboot), a kernel 930 (e.g., Linux), a software dataplane 940, and software applications 950. Downloading the software image 900 to the remote physical device is a non-service impacting activity for the customers. However, if a substantial number of remote physical devices are simultaneously restarted, a substantial load may be placed on the D-CMTS to provide configurations and connectivity. By using the previously described modified reset process, the software dataplane and/or the software applications can be selectively reset, with minimal impact on service to the customers or no impact on service to the customers, respectively.

Figure 10:
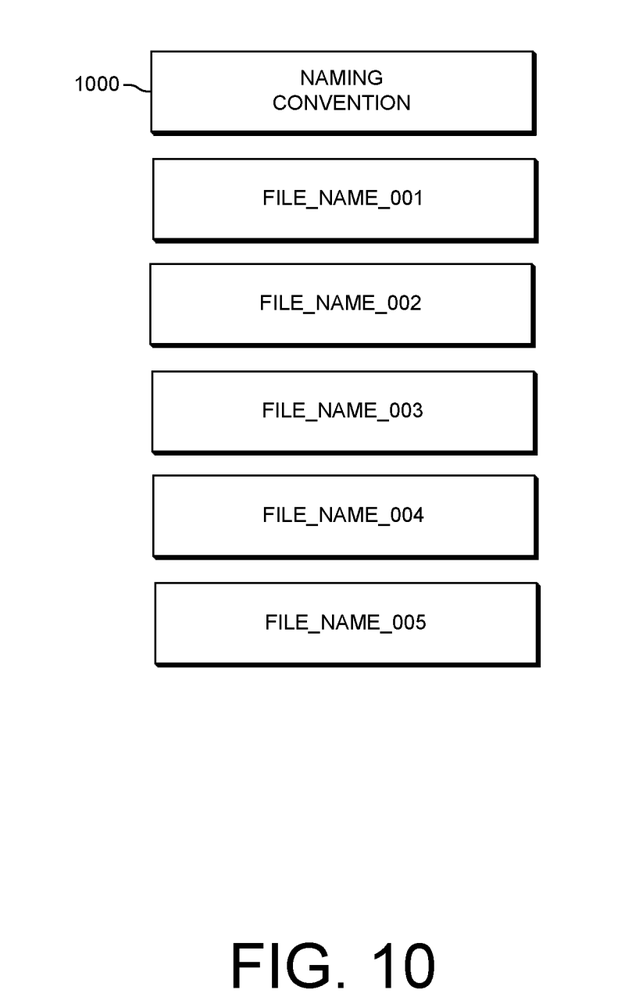
FIG. 10 illustrates a file naming convention for the software image.

Referring to FIG. 10, it is desirable to use the same software package 900, that includes all of the necessary components therein to perform a hard reset of the remote physical device 290, that is provided to the remote physical device 290 to achieve the desired type of reset process. In other words, it is desirable that the software package 900 that is provided to the remote physical device 290 include the necessary components to do a hard reset, a soft reset, or a modified reset. A file naming convention 1000, such as a version number, of the software package 900 may be selected in a manner to indicate the desired type of reset process to be performed. The image file name versioning may employ a scheme where a version string indicates whether (a) the FPGA/Kernel needs to be reloaded, (b) whether the software applications need to be reloaded, and/or (c) whether the software dataplane needs to be reloaded.

A version number of File_Name_001 1010 may be used to indicate that the file is intended to be used for a hard reset.

A version number of File_Name_002 1020 may be used to indicate that the file is intended to be used for a soft reset.

A version number of File_Name_003 1030 may be used to indicate that the file is intended to be used for a software dataplane of the dataplane reset.

A version number of File_Name_004 1040 may be used to indicate that the file is intended to be used for software applications of the control plane reset.

A version number of File_Name_005 1050 may be used to indicate that the file is intended to be used for a software dataplane and software applications reset.

When the remote physical device 290 is reset, it may use the version number (e.g., 001, 002, 003, 004, 005) to indicate which files should be used during the process of resetting. In some cases, system indicates whether a hard reset (e.g., 001) is desired or a soft reset (e.g., 002, 003, 004, 005) is desired. The version number is of assistance in determining which files should be used for the soft reset among the files included within the file. In this manner, in many cases, less than all of the files included within the software image are used for the particular reset.

Typically, a hard reset uses the FPGA image 910, the primary boot loader 920 (e.g., Uboot), the kernel 930 (e.g., Linux), the software dataplane 940, and the software applications 950.

Typically, a soft reset uses the software dataplane 940 and the software applications 950, albeit with limited caching of information.

Typically, a software dataplane reset uses the software dataplane 940, together with appropriate caching.

Typically, a software applications reset uses the software applications 950, together with appropriate caching.

Typically, a software dataplane and software applications reset uses the software dataplane 940 and the software applications 950, together with appropriate caching.

In some cases, the primary boot loader may be modified prior to performing the reset to decrease the time for the reset.

Moreover, each functional block or various features in each of the aforementioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

It will be appreciated that the invention is not restricted to the particular embodiment that has been described, and that variations may be made therein without departing from the scope of the invention as defined in the appended claims, as interpreted in accordance with principles of prevailing law, including the doctrine of equivalents or any other principle that enlarges the enforceable scope of a claim beyond its literal scope. Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated. The word "comprise" or a derivative thereof, when used in a claim, is used in a nonexclusive sense that is not intended to exclude the presence of other elements or steps in a claimed structure or method.

The invention claimed is:

1. A cable distribution system that includes a head end connected to a plurality of customer devices through a transmission network that includes a remote fiber node that converts digital data to analog data suitable for said plurality of customer devices, where said remote fiber node includes a processor, comprising the steps of:
   (a) said remote fiber node receiving a software image containing (i) a hardware image, (ii) a primary boot loader, (iii) a kernel, (iv) a software dataplane for a dataplane, and (v) software applications for a control plane;
   (b) based upon a file name of said software image selectively resetting a remote physical device in (i) a first manner based upon said file name that includes said resetting based upon a software dataplane for a dataplane and not software applications for a control plane, (ii) a second manner based upon said file name that includes said resetting based upon said software applications for said control plane and not said software dataplane for said dataplane, (iii) and a third manner based upon said file name that includes said resetting based upon said software dataplane for said dataplane and said software applications for said control plane.

2. The cable distribution system of claim 1 further comprising selective using (i) said hardware image, (ii) said primary boot loader, (iii) said kernel, (iv) said software dataplane for said dataplane, and (v) said software applications for said control plane, in resetting said remote physical device.

3. The cable distribution system of claim 1 further comprising selective using (i) said software dataplane for said dataplane and (ii) said software applications for said control plane, in resetting said remote physical device, and not using (iii) said hardware image, (iv) said primary boot loader, and (v) said kernel.

4. The cable distribution system of claim 1 further comprising selective using said software dataplane for said dataplane, in resetting said remote physical device, and not using (i) said hardware image, (ii) said primary boot loader, (iii) said kernel, (iv) said software applications for said control plane.

5. The cable distribution system of claim 1 further comprising selective using said software applications for said control plane, in resetting said remote physical device, and not using (i) said hardware image, (ii) said primary boot loader, (iii) said kernel, and (iv) said software dataplane for said dataplane.

6. A cable distribution system that includes a head end connected to a plurality of customer devices through a transmission network that includes a remote fiber node that converts digital data to analog data suitable for said plurality of customer devices, where said remote fiber node includes a processor, comprising the steps of:
   (a) said remote fiber node receiving a software image containing (i) a hardware image, (ii) a primary boot loader, (iii) a kernel, (iv) a software dataplane for a dataplane, and (v) software applications for a control plane;
   (b) said remote fiber node updating said primary boot loader from said software image while maintaining all services to said customer devices while updating said primary boot loader and without resetting of said remote fiber node;
   (c) after completion of said updating of said primary boot loader from said software image prior to receiving any additional software images, resetting said remote fiber node after updating said primary boot loader using said received software image including at least three of (i) a hardware image, (ii) a kernel, (iii) a software dataplane for a dataplane, and (iv) software applications for a control plane.

7. The cable distribution system of claim 1 further comprising the step of selectively using (i) said hardware image, (ii) said kernel, (iii) said software dataplane for said dataplane, and (iv) said software applications for said control plane, in resetting said remote physical device.

* * * * *